United States Patent [19]
Ligon et al.

[11] Patent Number: 5,358,397
[45] Date of Patent: Oct. 25, 1994

[54] APPARATUS FOR EXTRUDING FLOWABLE MATERIALS

[75] Inventors: Robert M. Ligon; Thomas B. Carter, both of Phoenix, Ariz.; Jurg Hauptli, Romeo, Mich.

[73] Assignee: L&L Products, Inc., Romeo, Mich.

[21] Appl. No.: 60,106

[22] Filed: May 10, 1993

[51] Int. Cl.$^5$ .................. B29C 47/92; B30B 15/26
[52] U.S. Cl. .................. 425/145; 156/244.11; 156/356; 156/500; 264/177.17; 264/177.19; 264/261; 264/323; 901/6; 901/46; 425/149; 425/162; 425/170; 425/192 R; 425/379.1
[58] Field of Search .......... 264/323, 177.1, 177.16, 264/177.17, 177.19, 261; 156/107, 108, 109, 244.11, 500, 356, 367; 425/192 R, 190, 208, 145, 149, 379.1, 162, 170; 118/692; 901/6, 46

[56] References Cited

U.S. PATENT DOCUMENTS

| | | | |
|---|---|---|---|
| 3,734,667 | 5/1973 | Dray | 425/192 R |
| 4,078,454 | 3/1978 | Murakami et al. | 425/192 R |
| 4,186,685 | 2/1980 | Chenel et al. | 156/109 |
| 4,234,372 | 11/1980 | Bernhard et al. | 156/109 |
| 4,714,425 | 12/1987 | Lenhardt | 156/109 |
| 4,909,869 | 3/1990 | Sakamoto et al. | 156/108 |
| 5,115,551 | 5/1992 | Goedderz et al. | 29/450 |
| 5,136,974 | 8/1992 | Lisec | 156/107 |
| 5,167,756 | 12/1992 | Lenhardt | 264/261 |
| 5,183,612 | 2/1993 | Suita et al. | 264/177.1 |
| 5,242,518 | 9/1993 | Riederer | 156/107 |

FOREIGN PATENT DOCUMENTS

| | | | |
|---|---|---|---|
| 0364701 | 4/1990 | European Pat. Off. | 264/211.21 |
| 54-01343 | 1/1979 | Japan | 156/107 |
| 4226321 | 8/1992 | Japan | 264/176.1 |

Primary Examiner—Jeffery Thurlow
Attorney, Agent, or Firm—Dykema Gossett

[57] ABSTRACT

A light weight extruder (20) is suitable for high production, in-line extrusion of flowable materials with high precision in the placement and control of the extruded material. The extruder uses a high torque hydraulic motor (72) to drive a feed screw (88) in dispensing highly viscous but flowable material through an extrusion die (126) of preselected configuration. A plurality of heating bands (114–118) surrounding the barrel (86) of the extruder provide precise control over the material temperature at the point of extrusion. In an alternate embodiment, an injection nozzle (120a) is provided with a plurality of independently controllable extrusion dies (128, 130, 132). The extruder is sufficiently light and manipulable such that it can be mounted on the end of the arm of a robot (122).

8 Claims, 6 Drawing Sheets

APPARATUS FOR EXTRUDING FLOWABLE MATERIALS

TECHNICAL FIELD

The present invention generally relates to a method and apparatus for extruding flowable materials, and deals more particularly with a system for controllably applying a bead of extruded material in place in precise locations on a part substrate, particularly on-line, in mass production line applications.

BACKGROUND OF THE INVENTION

Sealants, adhesives and similar flowable or moldable components are often used on various parts of assemblies which are assembled on a moving production line. Such sealants are used, for example between internal mating surfaces of automobile body parts to achieve adhesion, water tight seal and vibration isolation between these parts. Often times, the body parts are formed in a manner to specifically receive the sealants in certain locations; for example, the interior roof panel of an automobile may be formed with one or more channels therein, of various cross-sectional configurations, to receive a bead of sealant which adheres to and forms a seal with the outer roof panel of the automobile. The bead of sealant is preferably applied within the channel such that it initially possesses a cross-section similar to that of the channel but is expandable so that it fills the entire channel and moves into contact with a mating body part to form a proper seal.

In the past, sealants of the type described above have been sometimes applied to the parts on an off-line basis. That is to say that the sealants have been either preformed and/or applied to the parts which are stock piled and later installed into the assembly on the production line.

In some cases, attempts have been made to apply sealants on body parts directly on the assembly line by pumping the sealant from a bulk supply through a fluid line to a nozzle which a production worker manually manipulates to lay a bead of sealant into a predesired location on a body part. On-line pumping of sealants in this manner has not been entirely successful for a number of reasons. First, most "pumpable" sealants do not cure until they are heated when the assembled part is introduced into an oven on the assembly line. This delay in curing is undesirable for a number of reasons. Pumpable type sealants must possess requisite characteristics to allow them to flow through a long feed tube to the production line, yet these same characteristics often reduce the sealers performance in the areas of strength, shock vibration, etc. Also, the equipment needed to pump flowable sealants, and particularly those used to pump hot sealants can result in equipment problems, since those that have quick curing times commence curing (and thus altering their physical characteristics) as they flow through the supply tube to the exit nozzle.

Others in the past have devised extruders of various types which may be considered as portable. However, known portable extruders had been limited in their use to relatively flowable, low viscosity materials which are not suitable as sealants and adhesives in many applications, such as the assembly of automobile body parts. Automobile assembly operations require extremely high performance sealants and adhesives which typically possess extremely high viscosity and very short curing times.

There is therefore a need in the art for a method and apparatus for extruding in-place high viscosity, high performance flowable materials, in place in predetermined locations on a part substrate.

SUMMARY OF THE INVENTION

The present invention broadly involves a method and related apparatus for extruding flowable materials, particularly those that are highly viscous, into precise locations onto substrates, in a highly repeatable manner. The method and apparatus of the present invention are particularly well-suited for use on automated production lines, as in the manufacture of vehicles for example, where sealants, adhesives and similar high viscosity materials are extruded directly into place on an on-line basis. The apparatus broadly comprises a barrel shaped housing within which there is rotably disposed an extrusion screw driven by a hydraulic motor. Material in solid form such as pellets, for example, is supplied from a remote supply source through a tube to the extruder housing. A plurality of heating bands around the housing progressively heat the solid material as it is compressed by the extrusion screw so that the material melts and is extruded through an extrusion die at a carefully preselected pressure and temperature. The use of a hydraulic motor provides high torque and quick response so that material can be extruded into tight tolerance locations. However, the extruder unit is exceptionally light, allowing it to be mounted on the end of a robotic arm so that it can be easily manipulated for extruding material into place on an on-line basis.

The method of the present invention involves extruding flowable materials into precise locations on an on-line basis, as in assembly line operations.

Therefore, a primary object of the invention is to provide a method and related apparatus for extruding high viscosity, flowable materials in-place, and in preselected locations on part substrates.

Another object of the invention is to provide a method and apparatus as described above which permit extrusion of beads of the flowable material of predetermined cross-section which are precisely extruded into grooves, channels or other areas particularly adapted to receive these beads, and to do so quickly and precisely.

Another object of the present invention is to provide a portable extruder capable of extruding very high viscosity, flowable materials.

A further object of the invention is to provide a portable extrusion machine which is exceptionally light and is easily manipulated such that it may be mounted upon a robot arm or the like.

A further object of the present invention is to provide a method and apparatus as described above which eliminates the need for pumping flowable materials from a bulk source through a long supply tube to an extrusion nozzle.

These, and further objects and advantages of the invention will be made clear or will be become apparent during course of the following description of a preferred embodiment of the present invention.

BRIEF DESCRIPTION OF THE DRAWINGS

In the drawings, which form an integral part of the specification and are to be read in conjunction therewith, and in which like reference numerals are employed to designate identical parts in the various views.

DETAILED DESCRIPTION OF A PREFERRED EMBODIMENT

Figure 1:
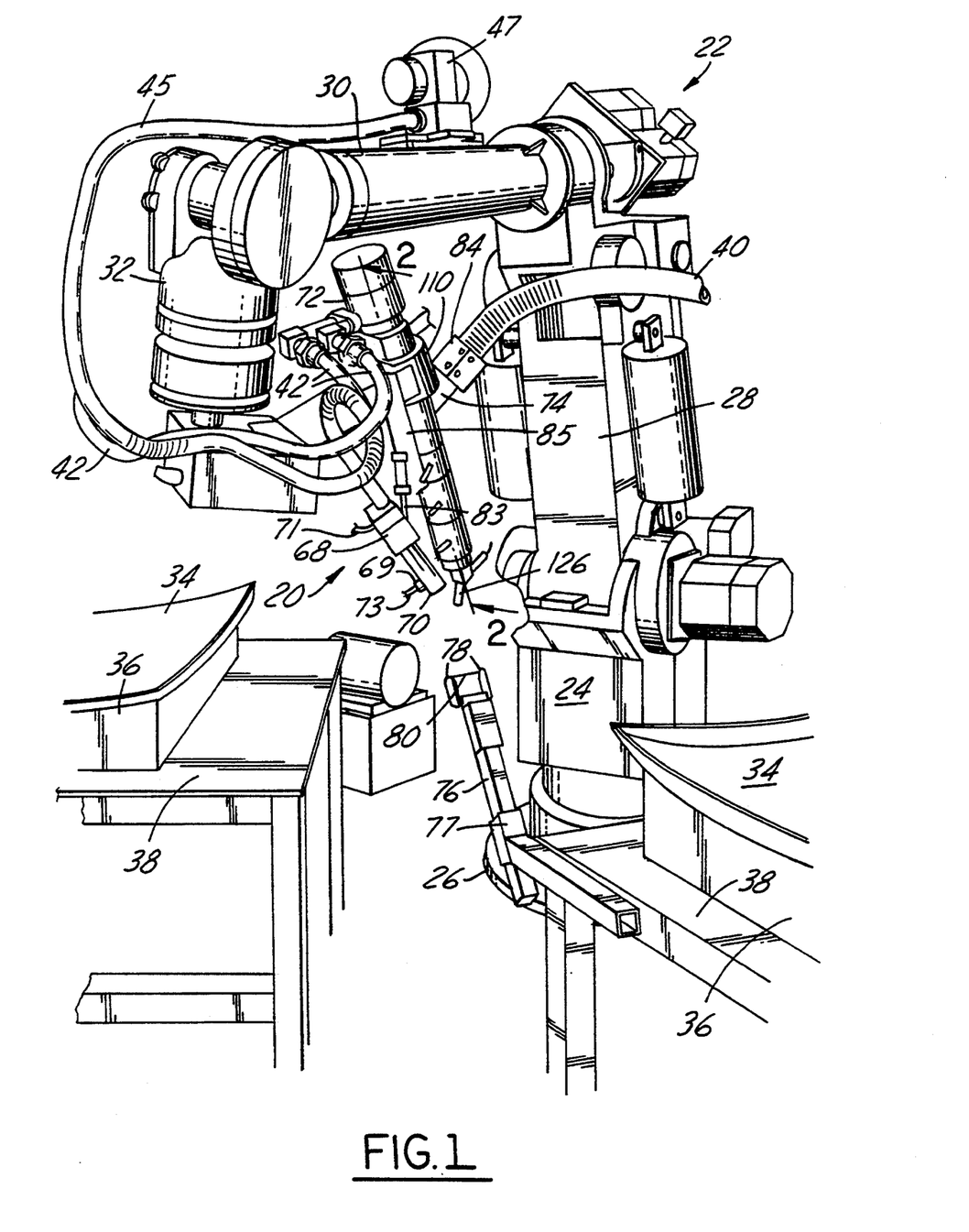
FIG. 1 is a perspective view of the portable extruder forming the preferred embodiment of the present invention, shown mounted on the end of a robotic arm, depicting use of the apparatus to apply extruded materials to parts on an off-line basis.
Figures 2, 8:
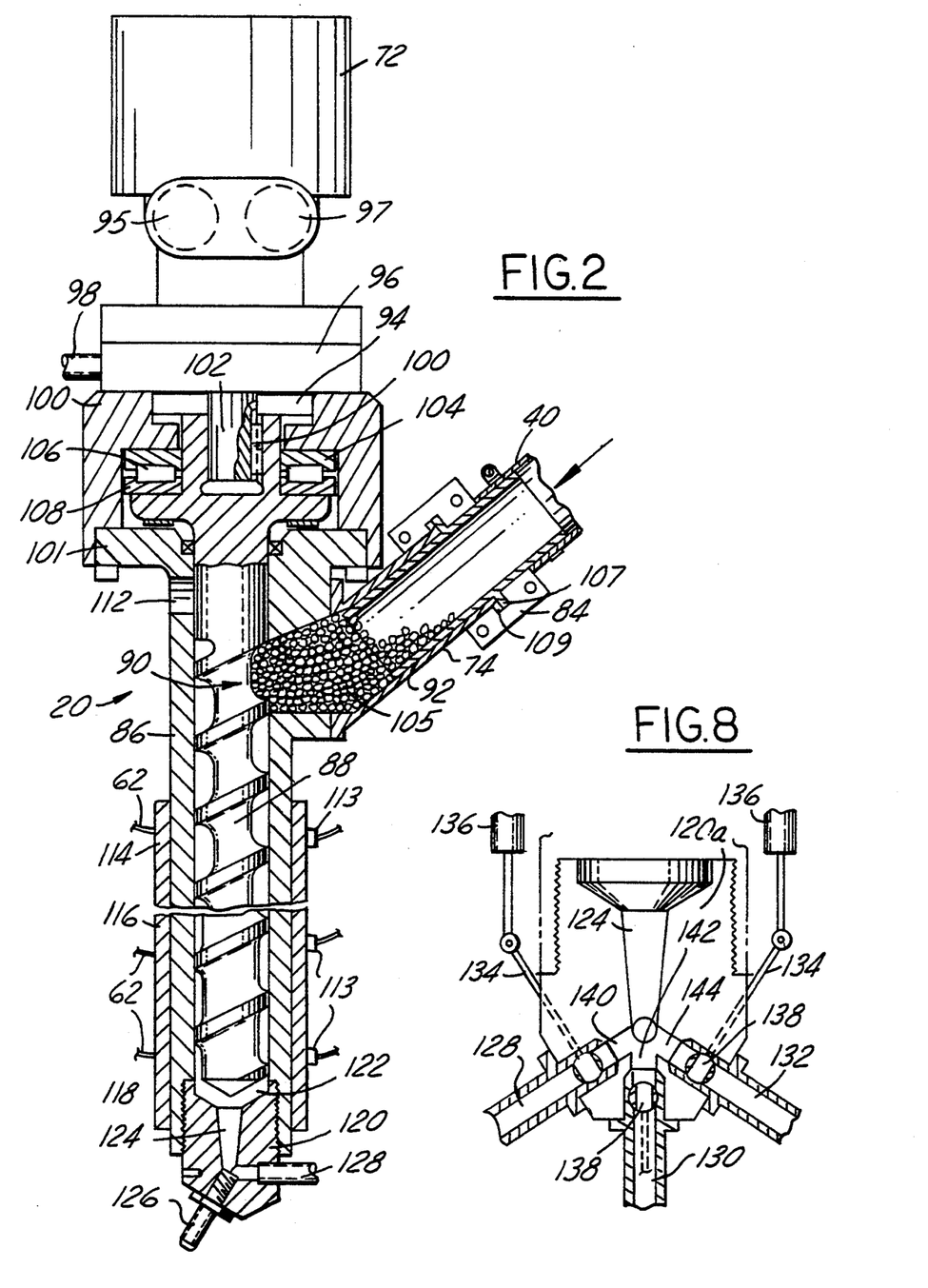
FIG. 2 is a sectional view of the portable extruder, taking along the line 2—2 in FIG. 1.
FIG. 8 is a fragmentary, cross-sectional view of an alternate form of a nozzle for use with the extruder of FIG. 1.
Figure 3:
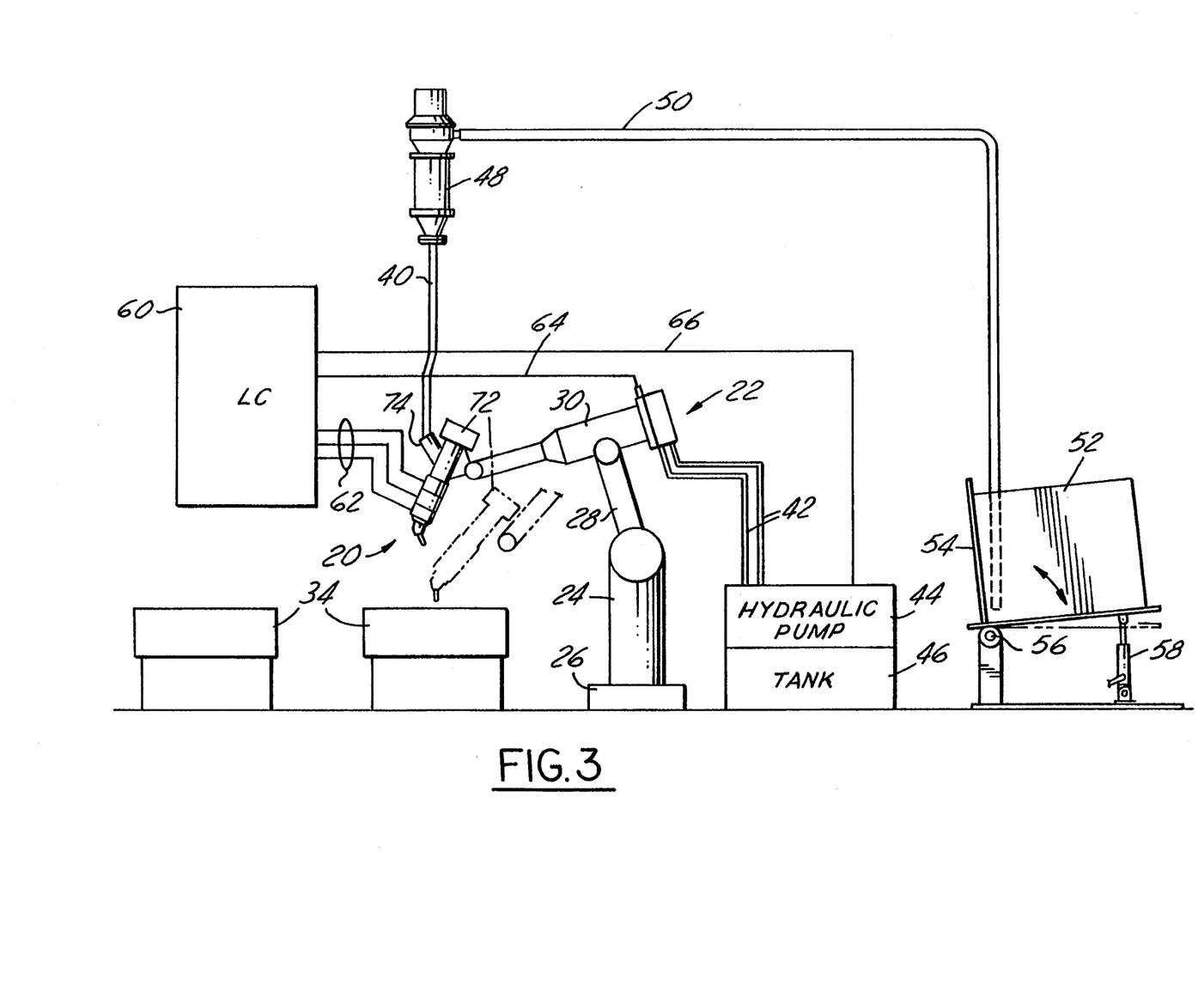
FIG. 3 is a diagrammatic view of the portable extruder shown in FIG. 1.

Referring first to FIGS. 1, 2 and 3, the present invention broadly relates to a light weight, portable material extruder, generally indicated by the numeral 20 which, in FIGS. 1 and 3 is shown mounted on a robot mechanism 22. The robot 22 comprises a stationarily mounted base 26 upon which there is rotatably mounted a turret 24, along with three pivotally connected arms 28, 30 and 32. The extruder 20 is mounted on the end of arm 32 and thus has freedom of movement about 6 axes.

In FIG. 1, the extruder 20 is operated on an off-line basis to apply extrusions at appropriate locations on stationary parts, such as the roof panels 34 which are mounted on jigs 36 supported on individual tables 38. The extruder 20 is powered by a hydraulic motor 72 which is coupled with a pair of hydraulic lines 42 to a hydraulic pump 44 and related reservoir tank of hydraulic fluid 46. The material extruded by the extruder 20 is supplied from a bin 52 in the form of pellets, granules, particles or the like, depending upon the nature of the material. The supply bin 52 is mounted upon a table 54 which tilts about a pivot point 56 in response to elevation by a pneumatic cylinder 58. Electrically operated vacuum pump 48 draws the solid pellets of material from the supply bin 52 through draw tube 50 to a point elevated above the extruder 20. The pellets are then gravity fed through feed tube 40 into an inlet tube 74 (FIG. 2) of the extruder 20.

In connection with extruding many forms of adhesives and sealers, particularly expandable adhesives, it is quite important to control shear characteristics of the material. In order to control shear, it is important to precisely control the temperature of the material; the application of an inordinate amount of compression to the material can result in heating the material to a level that adversely affects its shear characteristics. The use of a hydraulic motor to drive the extruder allows precise control over the compression characteristics of the extruder. The hydraulic motor 72 provides a large amount of torque and possesses a fast response curve, thus allowing the extrusion to be started and stopped very quickly. This control characteristic is very important in connection with extruding flowable materials into tight tolerance gaps and other locations.

As best seen in FIG. 3, virtually all functions of the extruder 20 and associated robot 22 are controlled by a PLC 60 (programmable logic controller). Electrical control signals are delivered from the PLC 60 via line 66 to the hydraulic pump 44, via line 64 to various servo motors on the robot 22 and via lines 62 to three separate heating elements 114, 116 and 118 surrounding the middle and lower reaches of the cylindrical barrel 86 of the extruder 20.

As best seen in FIG. 1, an air blower 47 mounted on arm 30 of robot 20 delivers air through line 45 to an electrically heated manifold 68 to which there is attached an outlet air nozzle 70. The manifold 68 and a temperature sensor 69 on the end of nozzle 70 are connected to the PLC 60 via lines 71 and 73, respectively. The manifold 68 is pivotably mounted on a rod 83 which is longitudinally adjustable within a threaded mounting flange 85 which is secured to a hub 110 forming part of the extruder 20. By this manner of mounting, the end of the nozzle 70 may be adjusted so as to direct warm air at a desired temperature onto the substrate in close proximity to the point where an extruded bead of material exits an extrusion die 126 and is deposited onto the substrate.

Referring particularly to FIG. 2, the hydraulic motor 72 includes a pair of threaded fluid ports 95, 97 which are adapted to be coupled with the hydraulic lines 42. Hydraulic motor 72 is mounted through a spacer 96 and adapter ring 94 to a cylindrical hub 110. The adapter ring 94 surrounds the output shaft 102 and is received within a cylindrical depreciation within the hub 110. A rotatable output shaft 102 of the motor 72 extends through the hub 96 and into an opening in the hub 110 where it is secured via a key 100 to the upper reaches of feed screw 88. A tach sensor 98 is mounted on the spacer 96 to sense the rotational speed of shaft 102. The upper end of the feed screw 88 is journaled for rotation within the hub by means of a thrust bearing comprising a pair of bearing races 104, 108 and roller bearings 106.

The upper end of the cylindrical barrel 86 includes a cylindrical flange 101 secured by bolts to a circumferentially extending shoulder of the hub 110. A lateral opening 112 in the sidewall of barrel 86 provides pressure relief. An inlet opening 90 in the barrel 86 allows the introduction of solid material pellets 105 into the interior of the barrel 86, at the upper end of the feed screw 88. The inlet feed tube 74 forms a slight dog leg feed path into the opening 90 which may, depending upon the nature of the pellets 105 and the attitude of the extruder 20, become jammed somewhat, from time to time, thereby potentially interrupting constant flow to the feed screw 88. To eliminate this problem a novel, swivel feed tube connection has been provided for coupling the feed tube 40 to the inlet tube 74. This connection comprises an inner, tubular sleeve 92 which extends down into the inlet tube 74 and is secured to the feed tube 40. The inner sleeve 92 includes a circumferential flange 107 which rotatably bears upon a mating flange 109 on the upper end of inlet tube 74. Flanges 107 and 109 are received within a groove in a collar 84 which is secured to sleeve 92 and has a portion surrounding inlet tube 74. From the description of the foregoing inner connection, it may thus be appreciated that the inner sleeve 92, collar 84 and feed tube 40 rotate independently of the inlet tube 74. By this arrangement, in the event that the pellets 105 of material jam near the bottom of the inlet tube 74, the rotational movement of the feed tube 40, and thus the inner sleeve 92 tends to dislodge the pellets so that they flow freely into the inlet opening 90 so as to smoothly feed into the screw 88. Also, it may be appreciated that the extruder may be moved and manipulated during the extrusion process through many degrees of motion without stressing or otherwise interfering with proper flow of pellets through the feed tube 40, since the feed tube 40 rotates freely upon the extruder 20.

As indicated earlier, the medial and lower reaches of the barrel 86 have mounted therearound band shaped heating elements 114 which are controlled by the PLC 60. The heating bands 114, 116 and 118 conformally surround the barrel 86 and are provided with temperature sensors 113 to provide temperature feed back information to a display (not shown) and the PLC 60. The lower heating band 118 can be seen to reach virtually to the end of the barrel 86, adjacent the extrusion nozzle 120. The heating bands 114–118 function to melt the pellets 105 into a flowable material which is fed by the screw action of feed screw 88 to an accumulating chamber 122 and thence through a tapered feed passage 124 within nozzle 120 to an extrusion die 126. Extrusion die 126 possesses an extrusion opening therein which has a cross-section conforming to the desired shape of the extruded bead. The extrusion die 126 is threadably received within in the nozzle 120 which in turn is threadably received within a lower threaded opening in barrel 86, concentric with the central axis of feed screw 88. A pressure sensor 128 secured within nozzle 120 delivers signals to the PLC 60 relating to the pressure of the flowable material as it enters the die 126.

In order to assure that a perfect bead emerges from the die 126 at the beginning of an extrusion cycle, it is preferred to wipe off any excess material from the end of the die 126 before such cycle is commenced. For this purpose, as shown in FIG. 1, a wiper may be provided comprising a wiping wire 80 held tauntly between the ends of two arms 78 which are mounted on the end of a rod 76. The rod 76 is slidably adjustable within a holder 77 mounted on the table 38. In order to wipe excess material from the end of the nozzle 126, the robot 22 simply moves the extruder 20 such that the outer end of the die 126 passes across the wire 80 which cuts off the excess material.

Attention is now directed to FIG. 8 which depicts, on a larger scale, an alternate form of nozzle arrangement for the extruder 20, in which a plurality of extrusion dies 128, 130 and 132 are provided. The multiple dies 128–132 may be positioned in the nozzle body 120a at any desired position or angle, relative to each other, and may possess die openings which differ in their characteristics (size, cross-sectional configuration, etc.). This permits on-line extrusion of differently configured beads without the need for changing dies or using multiple extruders. The bottom end of the feed passageway 124 delivers flowable material to the dies 128–132 via distribution channels 140, 142 and 144. Flow of the material is selectively controlled to the multiple dies 128–132 by means of valving, herein illustrated as ball valves 138 which are operated by linkage rods 138 operated by any suitable form of motors such as pneumatic cylinders 136.

Figures 4, 5, 6, 7A, 7B:
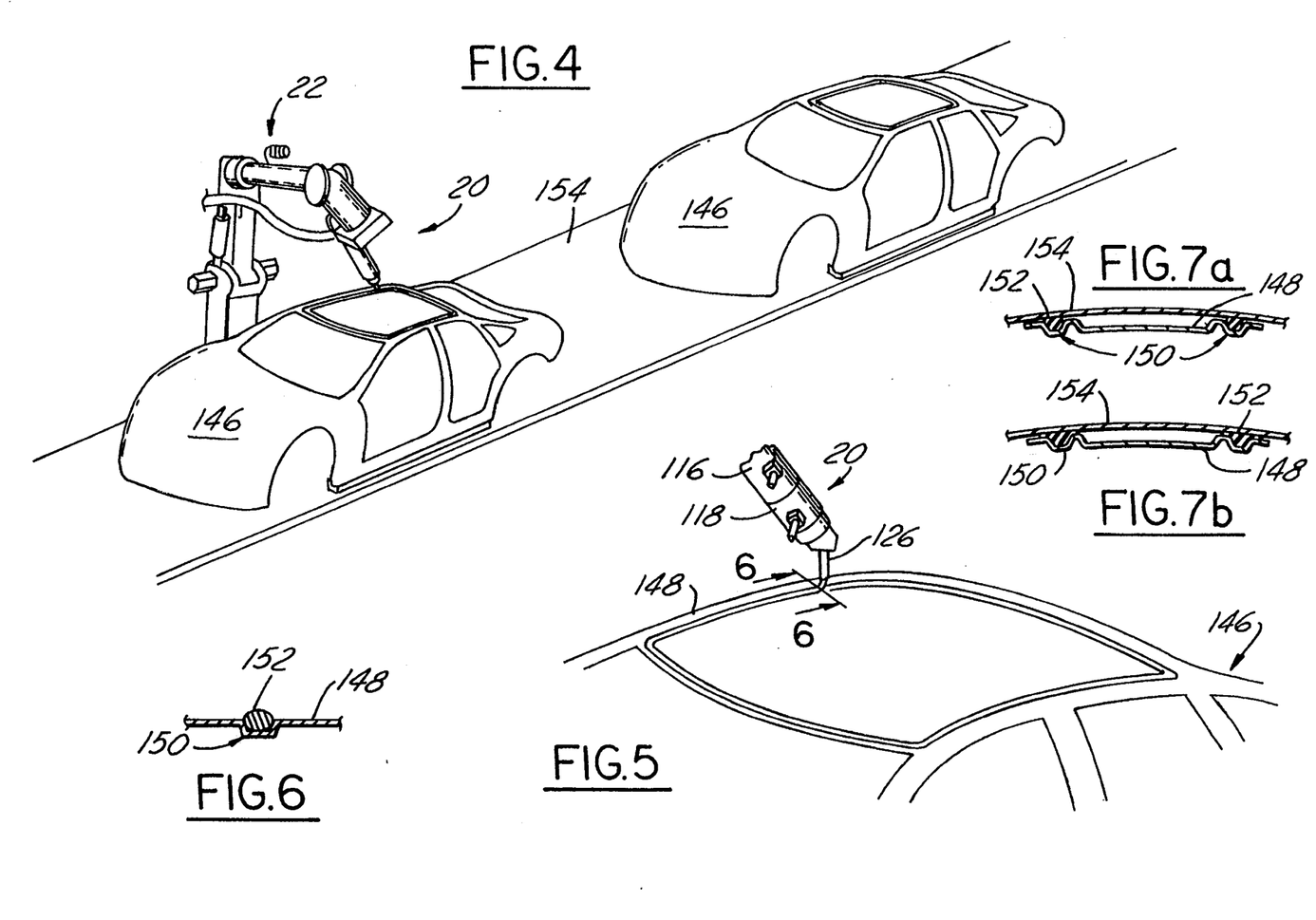
FIG. 4 is a view of the portable extruder of FIG. 1, but shown in relationship to an assembly line for manufacturing automobiles.
FIG. 5 is an enlarged, perspective view of a portion of a vehicle body and the extruder shown in FIG. 4.
FIG. 6 is a cross-sectional view taken along the line 6—6 in FIG. 5.
FIGS. 7a and 7b are views similar to FIG. 6 but showing a roof panel having been installed, and depicting the position of the extruded sealant bead respectively before and after expansion thereof.

Attention is now directed to FIGS. 4, 5 and 6 which depict the extruder 20 adapted for use in an in-line extrusion application for automated assembly of vehicles on a production line. Vehicle bodies 146 on a moving production line 154 pass by a sealant application station comprising the previously described extruder 20 mounted on the end of a robot 22. Under programmed control of the PLC 60 (FIG. 3) the extruder 20 automatically extrudes a bead 152 of material into a channel 150 formed in the roof surface 148 of each vehicle 146. By virtue of the precise control of material flow afforded by the use of the hydraulic motor 72, and the exceptionally light weight of the extruder 20 owing to its construction which allows it to be placed on the end of a robotic arm, a precisely configured bead of sealant may be introduced at the proper location within the channel 150 around the entire periphery of the roof surface 148, while the vehicle 146 moves down the assembly line.

As previously stated, it is quite important that the sealant bead 152 exit from the extruder 20 at the proper temperature, with proper flow characteristics and with a desired cross-sectional configuration so that the sealant bead 152 will properly perform its function. These material characteristics are particularly important in various applications, as for example where sealant material is used which later expands after curing or the application of heat, to fill voids between body parts. For example, FIG. 7a depicts the roof surface 148 immediately after a roof panel 154 has been installed in overlying relationship on the vehicle 146; a slight gap forming a void is present between the roof panel 154 and roof surface 148. FIG. 7b shows the relationship of these components after the bead of sealant has been expanded through curing and/or the application of heat to fill the void between the body parts. The control overflow characteristics of the sealant material is achieved in a very precise manner, for several reasons. First, as stated before, the use of a hydraulic motor 72 results in the provision of a very high level of torque to the feed screw 88, yet the weight of the hydraulic motor 72 is not so great as to preclude mounting the extruder 20 on a robot arm. The tachometer sensor 98 precisely senses the rotational rate of the feed screw 88, and thus provides immediate feedback information which allows the PLC 60 to control the hydraulic motor 72 accordingly. Also, the heating bands 114–118, along with temperature sensors 113 envelop the sealant material to define separately controllable heating zones and control the final temperature quite precisely as the material exits the extrusion die 126. The exact flow rate of sealant material exiting the die 126 is further controlled as result of the provision of the pressure sensor 128 which provides feedback information to the PLC 60 relative to the pressure of the sealant material immediately before it is extruded, which in turn is directly related to flow rate. The unique rotatable connection of the feed tube 40 to the extruder 20 also assures constant, controllable flow rate in that temporary interruption or diminution of material feed is eliminated. Finally, the provision of a flow of precisely directed hot air emanating from the heat nozzle 70 allows the substrate to be pre-heated, thereby better conditioning the extruded material to absorb oils and the like from the substrate.

Figure 9:
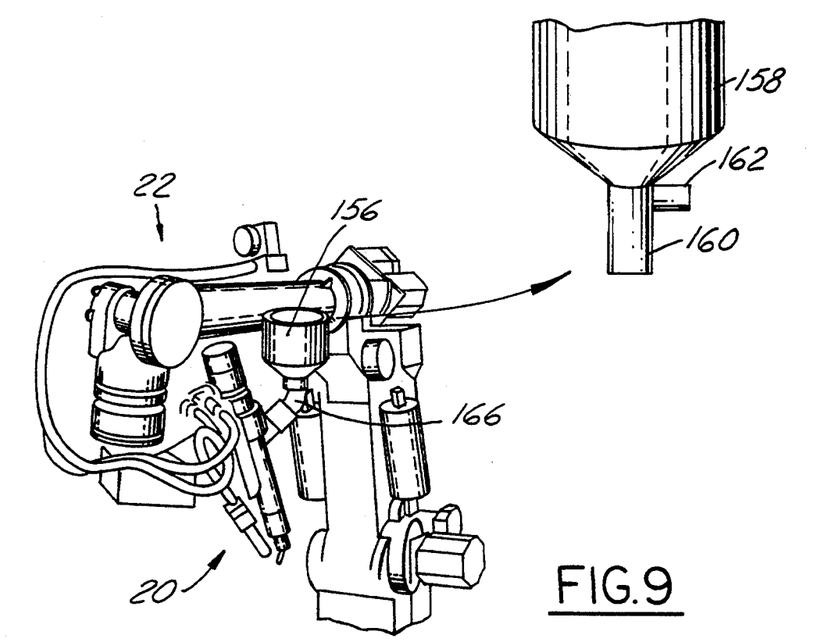
FIG. 9 is a perspective view of an extruder according to the present invention, depicting an alternate form of a material supply system.
Figure 10:
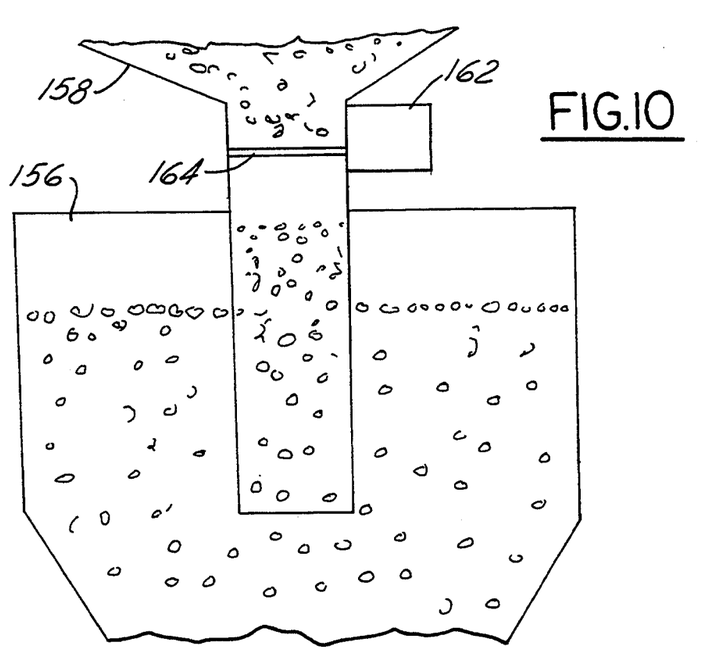
FIG. 10 is an enlarged, cross-sectional view of the batch hopper and supply feed tube of the system shown in FIG. 9, immediately after a batch has been dispensed.

For some applications, alternate forms for feeding solid pellets of a sealant material to the extruder 20 may be provided. For example, as shown in FIGS. 9 and 10, batch hopper 156 may be mounted on the extruder 20 to supply material pellets, rather than the flexible feed tube 40 discussed earlier. The batch hopper 156 gravity feeds pellets through an elbow tube 166 which is connected with the inlet tube 74. The size of the batch hopper 156 accommodates a single "batch" which is sufficient to apply sealant to a given part or for a specific job. In order to replenish the batch hopper 156, the robot 22 swings the extruder 20 to a loading position, in which the hopper 156 is positioned beneath a material dispenser 158, with a discharge tube 160 of the dispenser 168 extending down into the interior of the hopper 156, as best seen in FIG. 10. A motor member 162 which may be electrical, hydraulic or pneumatic, controls a discharge valve diagrammatically indicated by the numeral 164 in order to allow a single batch of material to be dispensed through the discharge tube 160 into the hopper 156. After a batch of material has been so discharged, the robot 22 lowers the extruder 20 into clearing relationship to the dispenser 158 and discharge tube 160. As the hopper 156 moves away in this manner, the remaining material within the discharge tube 160, beneath the valve 164, flows down and into the hopper 156.

Figures 11, 12:
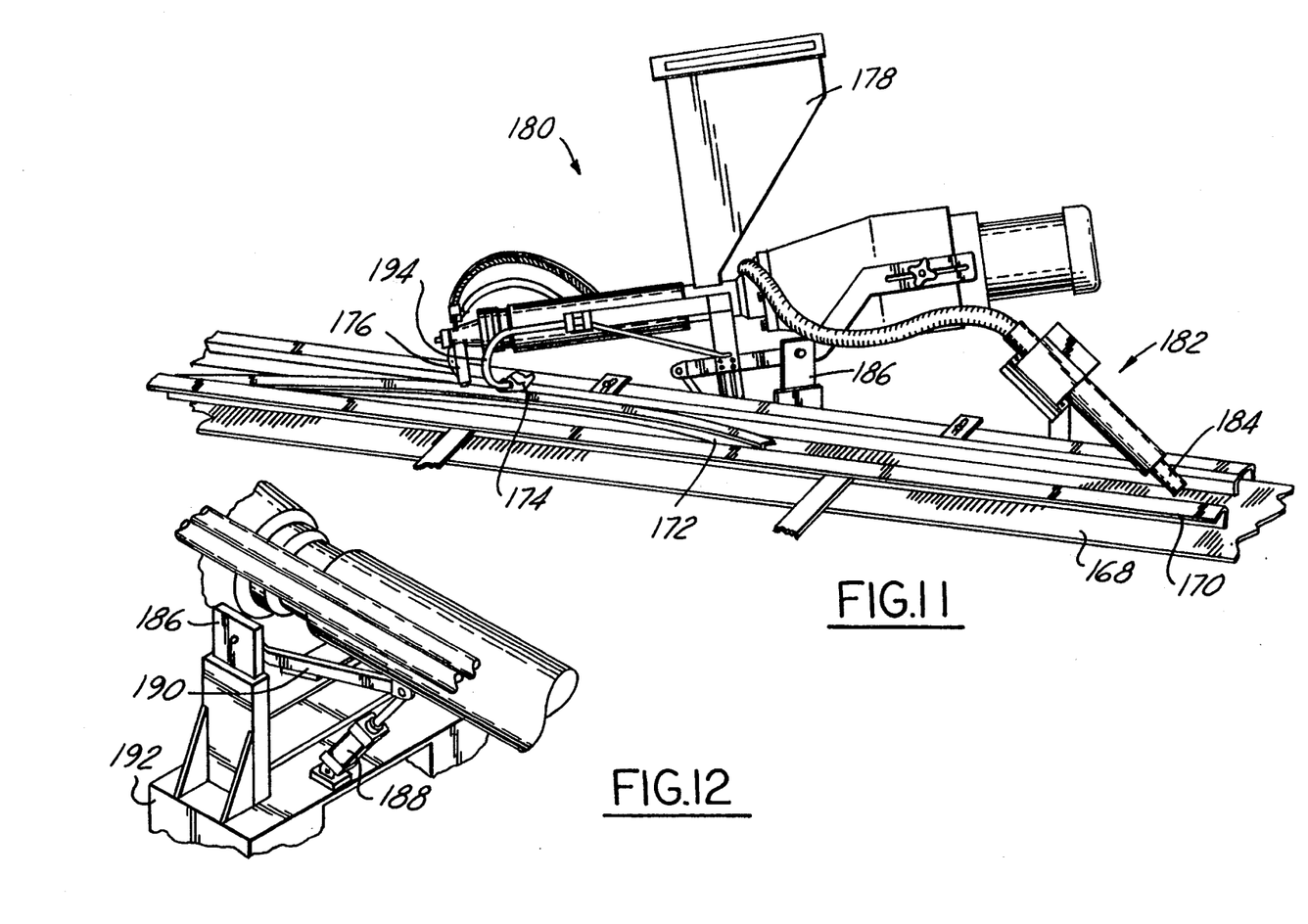
FIG. 11 is a perspective view of an alternate form of the extruder of the present invention, shown in relationship to a conveyor line.
FIG. 12 is a fragmentary rear view of the extruder of FIG. 11.

Attention is now directed to FIGS. 11 and 12 which depict an alternate form of the extruder of the present invention, generally indicated by the numeral 180. The extruder 180 is similar or identical to the previously described extruder in terms of its component parts; only those parts that may be different than those previously described will be discussed here. The extruder 180 is mounted for limited movement about two orthogonal axes, at a stationery position along an assembly line which includes a conveyor 168. Conveyor 168 moves parts such as the metal channel part 172 along a path guided by transversely spaced, stationary feed guides 170. Feed guides 170 precisely control the traverse positioning of the part 172 as it passes by the extruder 180.

The extruder 180 is pivotably mounted on a pair of spaced apart mounting flanges 186 which are secured to a base 192. A pair of forwardly extending arms 190 have one end connected to structure supporting the extruder 180, and the other end connected to the output shaft of a hydraulic or pneumatic cylinder 188 which functions to raise or lower the extrusion die 176. Counter weights, may be mounted on the opposite end of the extruder 180, as required, to achieve proper balance. A batch type hopper 178 is provided on the extruder 180 to supply pellets or other solid forms of sealant material. A hot air blower 182 is mounted up stream from the extrusion die 176 to apply hot air at a desired temperature via the exit nozzle 184 to preheat the part 172.

A guide shoe 174 mounted on a guide arm 194 of the extruder 180 is adapted to be received within a groove or channel in the part 192 and functions to pivot the extruder 180 about a vertical axis, depending upon the traverse position of the channel or groove within the part 172. In this manner, the shoe 174 acts as a camming guide to precisely move and locate the extrusion die 176 relative to the part channel so that the bead of sealant material is dispensed in precise registration within the groove or channel within the part 172.

From the foregoing, it may be appreciated that the present invention provides for the reliable accomplishment of the objects of the invention and does so in a particularly effective and economical manner. It is recognized, of course, that those skilled in the art may make various modifications or additions to the preferred embodiments chosen to illustrate the invention without departing from the spirit and scope of the present contributions of the art. Accordingly, it is to be understood that the protection sought and to be afforded hereby should be deemed to extend to the subject matter claimed and all equivalents thereof fairly within the scope of the invention.

What is claimed is:

1. An apparatus for extruding a highly viscous material onto a substrate, comprising:
   a housing defining an interior and an inlet opening to the interior at a first end of the housing for receiving material to be extruded and an outlet opening to the interior at a second end or the housing for exiting extruded material;
   a screw rotatably supported within said housing interior and extending between the first end of the housing and the second end of the housing for displacing and compressing the material within the housing;
   a nozzle arrangement including an extrusion die disposed at the second end of the housing defining a die opening through which material is extruded from the housing interior onto the substrate;
   hydraulically operated motor means connecting with the screw;
   means on the housing for heating said material to a desired temperature;
   a pressure sensor carried on the housing at the second end for generating a signal indicative of the pressure of the material at the second end; and
   a controller electrically connected to the hydraulically operated motor means and to the pressure sensor, for generating a control signal in response to the pressure signal and transmitting the control signal to the hydraulically operated motor means.

2. The apparatus of claim 1, including:
   an inlet tube extending from the inlet opening; and
   a swivel feed tube connection fixed to one of an end of a feed tube and an end of the inlet tube and enveloping and rotatably engaging the other of the end of the feed tube and the end of the inlet tube wherein the feed tube end can swivel with respect to the inlet tube.

3. The apparatus of claim 1, including a remote continuous feed system having:
   a remote reservoir for retaining solid pellets of material;
   a vacuum source;
   a vacuum draw tube disposed between the remote reservoir and the vacuum source; and
   a feed tube disposed between the vacuum source and the inlet opening.

4. The apparatus of claim 1, including a discrete localized feed system having a hopper connected to the inlet opening of the extruder with a volume of pellets dispensed into the hopper sufficient for a particular application.

5. The apparatus of claim 1, wherein said nozzle arrangement includes a selectively positionable plurality of extrusion dies.

6. The apparatus of claim 1, including:
   a feed guide establishing a position of a part for movement past the extrusion die; and a guide shoe fixed relative to the extrusion die and operably engaging the part for movement therealong.

7. The apparatus of claim 1, including:

a hot air blower located downstream of the extrusion die relative to a direction of movement between a substrate and the extrusion die and directing a flow of hot air at the substrate material.

8. The apparatus of claim 5, including a robotic mechanism having a selectively pivotal arm electrically connected to the controller and responsive thereto to which the housing is mounted.

* * * * *